Nov. 21, 1933.  A. LASCH ET AL  1,936,248

MIXING MACHINE

Filed March 1, 1932

Inventors
ALBERT LASCH
ERNST STRÖMER

By George B Willcox.

Attorney

Patented Nov. 21, 1933

1,936,248

UNITED STATES PATENT OFFICE 1,936,248

MIXING MACHINE

Albert Lasch, Cannstatt, and Ernst Strömer, Stuttgart, Germany, assignors to Baker Perkins Company, Inc., Saginaw, Mich., a corporation of New York Application March 1, 1932, Serial No. 596,132, and in Germany March 7, 1931

5 Claims. (Cl. 18—2)

This invention relates to machines for mixing, kneading, and plasticizing tough materials such as rubber, and has for its object the provision of a novel rotor element having a mixing and stretching action superior to that of the rotors used in previous machines and which in addition effectively mills or grinds the material. In the preparation of homogeneous mixtures of rubber, powdered chemicals, pigment, resin, reclaimed rubber etc. it is desirable that a milling of the material be effected to break down independent particles and more thoroughly incorporate the ingredients.

Heretofore this desired milling action has been attained to a small extent by increasing the end area of the blades or blade-carrying arms of the rotor to provide surfaces co-acting with the parallel adjacent end walls of the mixing trough.

The novel feature of our invention by which we attain the desired milling action is applicable to any machine having two or more rotors, preferably driven at differential speed, each of which co-operates with at least one of the other rotors, and it consists in providing one or more milling rolls as a part of each rotor having smooth or corrugated milling faces. These rolls are circular in cross section and cylindrical or conical in form and each roll is closely spaced from the surface of the trough and from the corresponding roll of the co-operating rotor.

A second novel feature of the invention consists in providing blades on the rotor having an improved form for effectively cutting the material against the saddle of the mixing trough and for more effectively kneading the material, working it from side to side in the trough. We accomplish this by providing a plurality of blades on the rotor, the working edge of at least one blade formed to have two oppositely directed helical sections joined to present an angle, such angle advanced in the direction of rotation of the rotor, and the working edge of at least one other blade similarly formed to present an angle retarded with respect to the direction of rotation of the rotor, so that each rotor has at least one blade which will operate to spread the material toward its ends and at least one other blade which will gather the material from its ends toward its center.

A third feature of the invention consists in the combination of the novel milling surfaces with the improved blades so that by virtue of their peculiar shapes the blades work the material alternately to and away from the milling rolls, effecting a speedy and thorough mixing, milling and plasticizing action.

Referring to the drawing.

Figure 3:
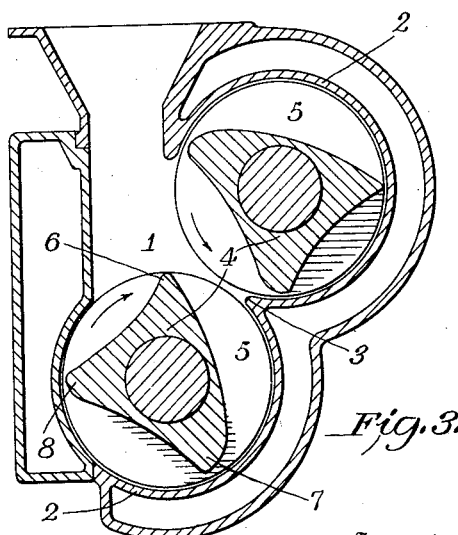
Fig. 3 is a cross section of a mixing machine taken at right angles to the axes of the rotors shown in Fig. 1, near one end of the blades, and shows their co-operative relationship to the cylindrical surface and saddle of the mixing machine, which is of known form.

Referring to Fig. 3, the mixing trough 1 of known form having two part-cylindrical portions 2, 2 forming a saddle 3 at their intersection, has two rotors 4 each rotatively mounted coaxially within one of the trough portions 2. Rotors 4 are coupled in known manner to a driving gear (not shown) which drives them oppositely to each other, as indicated by the arrows. Preferably they are driven at different speeds, but this is not necessary to obtain the advantages of the invention in the operation of the machine.

Figure 1:
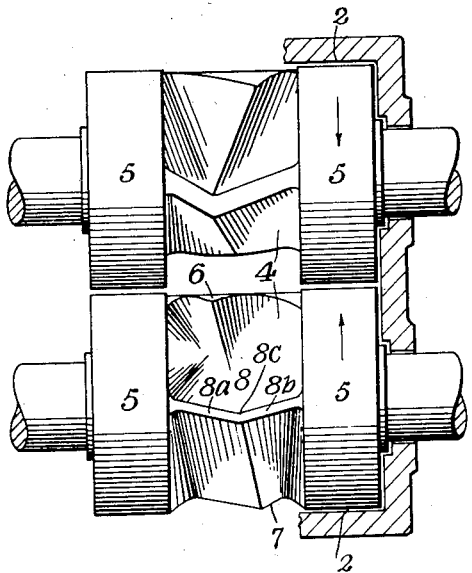
Fig. 1 is an elevation in a plane parallel to that of the axes of the rotors, showing two rotors embodying the features of my invention in their positions relative to each other in a mixing machine.

Referring to Fig. 1, a pair of cylindrical rolls 5 are formed integral with each rotor 4, and are of suitable diameter to afford the desired milling clearance from the surface of the trough and between the co-operating rolls. The surface of the milling rolls 5 may be smooth or corrugated, according to the kind of material to be worked.

Figure 4:
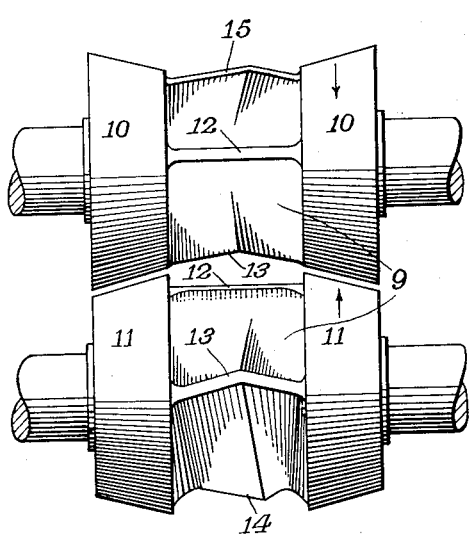
Fig. 4 is a view similar to Fig. 1 showing rotors having four blades and an alternative type of milling roll embodying the novel principles of the invention.

Fig. 4 shows a pair of rotors 9, the milling surfaces or rolls 10 of one being frusto-conical in form and positioned with their smaller diameters toward the ends of the rotor. Corresponding rolls 11 on the co-operating rotor are oppositely faced with their larger diameters toward the ends of the rotor. The taper of the rolls 9 and 10 is the same so that their milling surfaces are parallel to each other. To employ this alternative form of milling roll the trough and the saddle between trough sections are appropriately formed to conform to the shape of the rotors. As still another alternative, one milling roll 5, or 11, may be located near the middle of each rotor of a pair, with the blade portions at the ends of the milling surfaces.

Figure 2:
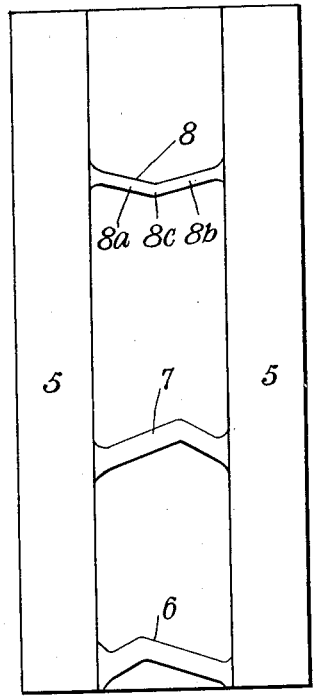
Fig. 2 is a development of the surface of one of the rotors shown in Fig. 1.

The improved blade structure constituting the second feature of the invention is shown in Figs. 1 and 2. Rotor 4 has three blades 6, 7, 8. At least one blade, 8, has its working edge bent to form two oppositely directed straight or helical sections 8a and 8b which join intermediate the ends of the blade to present an angle 8c. This angle 8c is retarded with respect to the direction of rotation of the rotor to operate to gather the material from the ends of the trough toward the center. At least one of the other blades, for example blade 6, is similarly bent to present an angle advanced in the direction of rotation of the rotor to spread the material from the center of the trough toward its ends. Blade 7 is shown bent to present an angle similar to that of blade 6, but may be straight or may have its angle facing in the opposite direction.

Referring to Fig. 4, a rotor 10 or 11 may be built according to the invention with four blades 12, 13, 14, 15, of which blades 13 and 14 present angles faced in one direction, blade 15 presents an angle faced in the opposite direction, and blade 12 is straight. Any form of rotor having two or more blades may be fashioned after this invention, so long as at least one blade presents an angle faced in one direction and at least one blade presents an angle faced in the opposite direction.

In the operation of the machine material is charged into the trough 1 and with rotors 4 oppositely driven at differential speeds, the material is not only stretched and kneaded by the blades and sheared against saddle 3, but is also ground and rubbed between rolls 5 in a purely milling operation. The material is also rubbed and spread against the end walls and curved surfaces of the part-cylindrical trough portions 2 by the rolls. Thus we obtain in one machine the operating advantages of both the milling rolls and of the masticating blades, resulting in a more thorough and rapid mixing of the material than can be accomplished by a machine employing milling rolls alone or mixing blades alone.

The combination in one rotor of the milling rolls and the angular material spreading and gathering blades, which effectively circulate the material between the milling surfaces, affords the greatest advantages in operation and they are so described and shown in the drawings. However, the milling rolls may advantageously be employed with the old type straight or helical blades, or the improved blades may be employed alone, and such independent use of either feature lies within the scope of the invention as set forth in the claims.

Having thus described our invention, what we claim and desire to secure by Letters Patent is:

1. A mixing machine comprising in combination a trough having two parallel part-cylindrical sections, two parallel rotors, each rotatively mounted concentrically within one of said trough sections, each of said rotors having two cylindrical milling rolls, one at each end, each of said rolls having its end surface positioned in milling relation to the end wall of the trough and its cylindrical surface in milling relation to the part-cylindrical trough surface and to the cylindrical surface of the corresponding roll of the other rotor, and a plurality of radially projecting blades on each rotor extending between said milling rolls, at least one of said blades having its working edge formed with two oppositely directed helical sections joined to present an angle, such angle advanced in the direction of rotation of the rotor, and at least one blade similarly formed to present an angle retarded with respect to the direction of rotation of the rotor.

2. A rotor for a mixing machine comprising two milling rolls one at each end of the rotor, said rolls circular in cross section taken perpendicular to the rotor axis, and a plurality of blades extending between said rolls, at least one of said blades having its working edge formed with two oppositely directed substantially helical sections joined to present an angle, such angle advanced in the direction of rotation of the rotor, and at least one blade similarly formed to present an angle retarded with respect to the direction of rotation of the rotor.

3. In a rotor for a mixing machine, a plurality of blades extending substantially lengthwise of the rotor, at least one of said blades having its working edge formed with two oppositely directed substantially helical sections joined to present an angle, such angle advanced in the direction of rotation of the rotor, and at least one blade similarly formed to present an angle retarded with respect to the direction of rotation of the rotor.

4. A rotor for a mixing machine comprising two milling rolls, one at each end of the rotor, and a mixing blade extending between said rolls, and having a radius at no point greater than the maximum radius of said milling rolls.

5. In a mixing machine, a pair of rotors, each of said rotors having a plurality of mixing blades and a milling roll, said pair of rotors mounted parallel to each other so that the roll and the blades of one rotor co-operate respectively with the roll and the blades of the other rotor.

ALBERT LASCH.
ERNST STRÖMER.